United States Patent [19]
Wolff

[11] Patent Number: 4,885,040
[45] Date of Patent: Dec. 5, 1989

[54] PROCEDURE FOR MANUFACTURING A SCREEN-MAT AS AN IN-LAY FOR SYSTEMATIC SCREEN FIELDS

[75] Inventor: Kurt Wolff, Dinslaken, Fed. Rep. of Germany

[73] Assignee: Steinhaus GmbH, Mulheim, Fed. Rep. of Germany

[21] Appl. No.: 196,528

[22] Filed: May 20, 1988

[30] Foreign Application Priority Data

May 16, 1987 [DE] Fed. Rep. of Germany ....... 3716472

[51] Int. Cl.⁴ .............................................. B29C 47/00
[52] U.S. Cl. ........................... 156/244.18; 156/244.25; 156/252; 156/253; 156/304.5; 209/399
[58] Field of Search ...................... 156/244.18, 244.25, 156/252, 253, 264, 304.5; 209/399

[56] References Cited

U.S. PATENT DOCUMENTS

| | | | |
|---|---|---|---|
| 3,711,360 | 1/1973 | Kent | 156/264 |
| 3,970,550 | 7/1976 | Fry et al. | 209/399 |
| 4,120,784 | 10/1978 | Hassall | 209/399 |
| 4,265,742 | 5/1981 | Bucker et al. | 209/399 |
| 4,661,245 | 4/1987 | Rutherford et al. | 209/399 |
| 4,752,512 | 6/1988 | Wolff | 156/304.5 |

*Primary Examiner*—Caleb Weston
*Attorney, Agent, or Firm*—Pollock, VandeSande and Priddy

[57] ABSTRACT

The invention concerns a procedure for manufacturing a screen-in-lay for systematic-screen fields with square or rectangular frame elements which can be attached to a substructure, on which a correspondingly square or rectangular screen-mat made of a rubber-elastic material, with perforated areas is attached in such a way as to be removable. The screen-mat has boshable, continuous ribs, which can be boshed into corresponding recessions at the upper sides of the flanges of the frame elements. The manufacturing expense for such a screen in-lay is to be reduced by having a section of a flat material cut off for the manufacture of the screen mat, such that only minimal work must still be undertaken on such a section in order to obtain a completed screen mat. For this purpose, at least one longitudinal rib running through until the ends is formed onto the underside of each of the two longitudinal edges of the screen-mat, and strips protruding downwards are attached at the underside of the two transverse sides of the screen mat between the two longitudinal edges, which have bosh ribs downwards which are perpendicular to the longitudinal ribs.

8 Claims, 1 Drawing Sheet

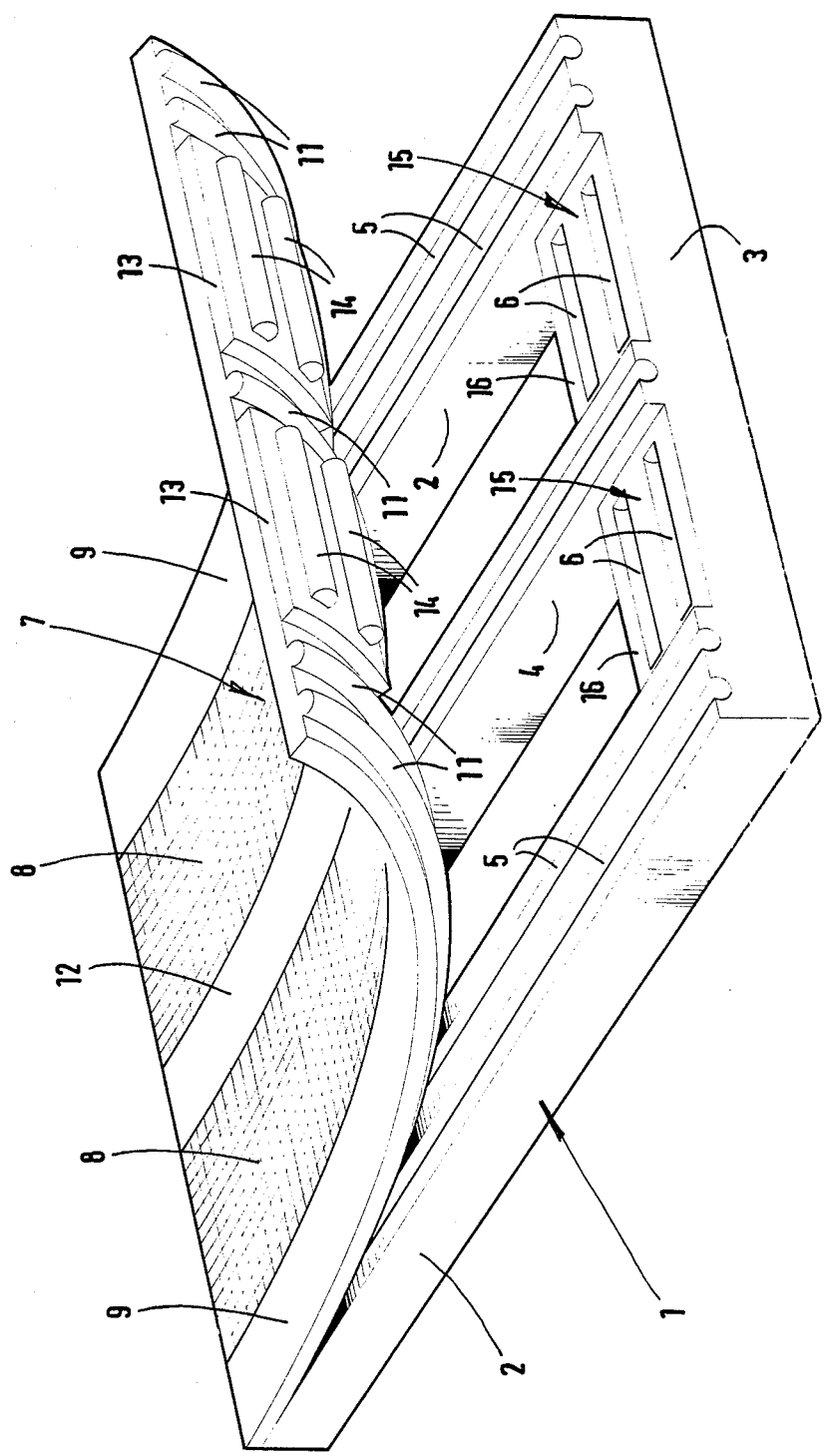

PROCEDURE FOR MANUFACTURING A SCREEN-MAT AS AN IN-LAY FOR SYSTEMATIC SCREEN FIELDS

The invention concerns a procedure for manufacturing a screen-mat as an in-lay for systematic-screen fields.

A screen in-lay is known from Publication DE-U1 82 35 2125 on which bosh ribs are installed at the lower side to the screen mat, parallel along the outside edges; these are either placed upon the screen mat or constructed as part of the latter. However, to place the bosh ribs circumferentially around the lower edge of the screen mat is a complicated and therefore expensive work procedure, while on the other hand, the construction of such a screen mat with such bosh ribs incorporated into it which are installed circumferentially upon it, is made more expensive due to the fact that, in the usual casting manufacturing process, a separate, open casting mold has to be provided, and the open-casting procedures in centrifuges or casting plates are very expensive. Such screen-mats are manufactured of duroplastic synthetics such as polyurethane, either with or without sifting-holes. In manufacturing without sifting holes, a subsequent manufacture of sifting-holes by means of punching occurs. The punched out pieces, the so-called hole-scraps, are not recyclable and are hence waste.

The invention therefore faces the problem of reducing the expense for such a screen in-lay so that a suitable flat material be manufactured and cut in lengths such that only minimal work would have to be accomplished on the cut-off lengths in order to obtain the completed screen mats.

The particular advantages of the invention are that the screen mat may be manufactured of an easily-manufactured flat material of rubber-elastic production material, whereby the flat material is first of all extruded using a suitable synthetic, advantageously in such a way that the longitudinal ribs of what is to become the screen mat, which are to serve as bosh elements, are already formed intergrally onto the two longitudinal edges. Only thermoplastic synthetic material is suitable for extrusion, and offers the additional advantage that, with the renewed application of heat and pressure, possibly after being reduced to small pieces, the parts involved can be repeatedly reformed. Thus, superfluous or rejected parts made of thermoplastic synthetic material are not waste material; rather that material can be used to manufacture new parts.

Although it is basically possible that the perforated areas of the inventive screen-mat may be formed in the material immediately during the extrusion procedure, or immediately thereafter, it is especially advantageous to punch the holes into the completed flat material, or into the cut-off section thereof which corresponds to the length of the screen-mats. For in that case, the punched-out portions, the so-called hole-scraps, may if necessary be passed back to the raw material from which the flat material is formed. That is only possible because a thermoplastic synthetic material is used for the screen mat.

It is important that bosh means may be installed subsequently at the transverse sides of the flat sections, which are cut off to the lengths of screen mats, for the complete edge-circumferential attachment of the screen mat onto the frame-flanges, by gluing on or welding on strips which for this purpose protrude downward, between the longitudinal edges, and at short intervals between the longitudinal ribs of the flat-material section concerned, which strips again have ribs protruding downwards. Thus, it is possible to produce screen mats of prescribed width, but of variable length, extremely economically, using the practically endlessly reproduceable flat material, which may be stored in rolls of great length. It is of no importance whether or not the perforated areas reach to the edge of the screen mat at the transverse sides, since a reinforcement of the transverse sides by means of the separately-attached bosh strips will in any case result. On the other hand, it is possible to provide transverse-flanges in the flat material between perforated areas which are separated from one another, along the longitudinal middle of which flanges the flat material is separated during the cutting-off of the flat-material sections. In this way, transverse-edges are obtained at the cut-off flat-material transverse-sections, at the bottom sides of which the bosh strips can then be glued or welded on. That, of course, presupposes that a certain grid-measurement be maintained during the cutting-off of the individual material sections, which measurement shall be predetermined by the interval of the transverse flanges between the perforated zones of the flat material.

The strips which, if appropriate, protrude downwards from the transverse edges of the completed screen mat, and the bosh ribs located there, require that depressions be provided in the basically parallel-planed top side of the frame flanges with the negative contour of the strips protruding downward from the underside of the screen mat. Corresponding groove-shaped recessions are located at the bottom of these depressions for the reception of the bosh ribs which are installed on the strips attached to the underside of the screen mat.

The stated advantages are provided also with screen in-lays with screen mats which have one or more medial flanges parallel to the edge flanges. These medial flanges, too, are part of the original flat material, whereby here, too, a form-locking connection using one or more of the bosh ribs formed onto the underside of the medial flanges, with the corresponding medial flanges of the flat-material elements is possible. Since the inventive screen in-lay is also useful for equipping oscillating screens, the additional form-locking connection between the medial flanges of the screen mat and of the frame element, respectively, can be dispensed with.

For use with especially critical sifting-material with a tendency to infiltrate the screen-mat in the area of its bearing points, it is advantageous to provide at least two parallel bosh ribs and grooves each for the form-locking connection between the screen mat and the frame flanges, which should be installed as close to the two mutually opposite longitudinal edges of the frame flanges.

It is also possible to give the installed screen mat a drum-head-like tension by means of the installation of the bosh ribs onto the screen mat on the one hand and the correspondingly-selected intervals of the associated bosh grooves on the upper side of the frame elements on the other, particularly if the transverse intervals of the longitudinal bosh strips on the underside of the screen mat are less than the transverse intervals of the corresponding bosh grooves on the upper side of the framed elements.

Additional advantageous embodiment characteristics of the invention may be deduced from the subordinate claims.

The invention will below be explained in greater detail by reference to the drawing and by way of a single embodiment example.

The drawing shows in top-diagonal perspective view a screen-in-lay element for a systematic-screen field.

In particular, the drawing shows a frame element 1 which can be rigidly connected by means of attachment means, which are not shown, with a substructure of a systematic-screen field. In particular, bosh or expansion anchors can be used for this purpose, which anchors can be formed onto the frame element 1 with an underside-overlap, provided that element is made of a sufficiently-elastic working material.

A large number of such frame elements 1, which have a square and/or rectangular basic shape, are required to cover a systematic-screen field, whereby the frame elements 1 are arranged in such a way as to interlock tightly with one another. They represent in each case only the intermediate element which carries the active sifting element, and can remain rigidly connected to the substructure if the sifting elements are to be replaced.

Each frame element 1 is composed of longitudinal flanges 2 and transverse flanges 3, the upper sides of which form a support. In addition, medial flanges 4 may extend between the transverse flanges 3, parallel to the longitudinal flanges 2. Bosh grooves 5 are formed into the upper sides of the longitudinalflanges 2, which serve as a support, and possibly, too, into the medial flanges 4, which grooves are parallel to one another in the longitudinal direction of the frame element 1. In each case, they extend up to the transverse-side ends of the frame element 1. On their supporting upper sides, the transverse flanges 3 have bosh grooves 6 which are parallel to one another in the transverse direction, whereby in this case, the supporting upper sides are formed in each case by the bottom 16 of the depressions 15. The bosh grooves 6 may, for technical reasons relating to the shape, be drawn through to the longitudinal sides of the frame element 1, whereby interstices with the bosh grooves 5 of the longitudinal flanges 2, and possibly also with those of the medial flanges 4, will then be formed.

A screen-mat 7 made of a thermoplastic synthetic material is snapped onto the upper side of the frame element 1, which has perforated zones 8 in the area between the longitudinal flanges 2 of the frame element 1. At least along the underside of its edges 9, the screen-mat 7 is connected by form-lock by means of the bosh grooves 5 with the longitudinal flanges 2 of the form element 1, which purpose is served by corresponding longitudinal ribs 11 at the underside in the edge area of the screen mat 7. Beyond the area of contact of the longitudinal ribs 11 the screen mat 7 has a level support surface, whereby the longitudinal ribs 11 which protrude above the underside of the screen mat are formed intergrally as part of the screen mat. In the same manner, the screen mat 7 may have one or more flanges 12 along its longitudinal median, with one or more longitudinal ribs 11 placed against its underside.

Stips 13 of approximately the same width as the transverse flanges 3 of the frame element 1 are attached to the underside of the screen mat 7 between the median flange 12 and the longitudinal edges 9, which overlap the screen mat 7 on the lower side. The strips 13 can be glued or welded onto the underside of the screen mat 7, so that they protrude downwards past the supporting surface of the screen mat 7. The above-mentiooned depressions 15 at the upper side of the frame element 1 in the area of the transverse flanges 3 form the negative profile of the strips 13, so that when the screen mat 7 is boshed onto the frame element 1, the strips 13 can protrude into these depressions 15 in such a way as to form-lock.

Bush ribs 14 running in the transverse direction serve to bosh the strips 13 together with the bosh grooves 6 in the area of the depressions 15 of the transverse flanges 3 of the frame element 1, which ribs are formed integrally onto the strips 13 and protrude downward beyond the underside of the latter. Due to the later attachment of the strips 13 onto the screen mat 7, the bush ribs 14 cannot run transversely across the entire width of the screen mat 7 in the.

The strips 13 can even be attached sufficiently firmly to the screen mat 7 if—as shown in the drawing—the perforated zones 8 run through to the transverse side. The strip 13 covers perforated zone 8 from the bottom in the transverse edge area in such a way that the sifted material cannot affect the transverse flanges 3 of the frame element 1, which are below it.

The screen mat 7 is connected detachably to the frame element 1 at its underside along the longitudinal edges 9 and the frame ribs 14, by means of the bosh ribs 11. It can therefore be replaced, like an independent exchangeable paryt, without the frame element 1 having to be removed from the supporting structure of the systematic-screen field. Thus, the screen mat 7 is an in and of itself exchangeable, active sifting element.

During production, the screen mat 7 is cut off from a prefabricated flat material, whereby the bosh flanges 11 are already formed into the flat material along the longitudinal edges of the latter. The perforated zones 8 can also be formed in during production of the flat material, or else punched in afterwards. After cutting of the flat material to the necessary length of each screen mat 7, the strips 13 with the bosh ribs 14 running in transverse direction are glued or welded onto the underside of the screen mat 7. The strips, too, may be cut off of a prefabricated flat material.

I claim:

1. A method of manufacturing a screen mat that can be removably attached to a supporting frame element, comprising the steps of extruding a thermoplastic synthetic material to form an elongated extrusion having upper and lower flat surfaces and having at least one integral longitudinal rib extending in the direction of elongation of said extrusion and protruding outwardly from said lower surface adjacent to each of the longitudinal edges of said extrusion, cutting said extrusion in directions transverse to said longitudinal edges to provide a section of said extrusion of desired length, said section having said longitudinal edges and lower flat surface with said integral longitudinal ribs thereon and also having transverse edges formed by said cutting step, and attaching strips of material to said lower flat surface of said extrusion section at positions between said longitudinal ribs, each of said attached strips having at least one further rib extending outwardly of said strip, and each of said strips being so oriented that said further rib extends in a direction transverse to said longitudinal ribs.

2. The method of claim 1 wherein said strips are attached to said lower surface of said extrusion section adjacent to each of the transverse edges of said section.

3. The method of claim 2 wherein each of said strips is glued to said lower surface of said section.

4. The method of claim 2 wherein each of said strips is welded to said lower surface of said section.

5. The method of claim 1 wherein said extruding step forms at one medial rib that protrudes outwardly of said lower surface between and parallel to each of said longitudinal ribs, separate ones of said strips having said further ribs thereon being attached to said lower surface of said extrusion section between said medial rib and each of said longitudinal ribs respectively.

6. The method of claim 1 including the step of forming perforated areas in said extrusion section by punching holes into said extrusion prior to performing said cutting step.

7. The method of claim 1 including the step of punching holes into said extrusion section subsequent to said cutting step to form perforated areas in said section.

8. The method of claim 1 wherein perforated areas are formed in said extrusion during said extruding step.

* * * * *